United States Patent
Lund et al.

(10) Patent No.: US 11,955,800 B2
(45) Date of Patent: Apr. 9, 2024

(54) METHOD AND CONTROL SYSTEMS FOR VOLTAGE CONTROL IN RENEWABLE ENERGY POWER PLANT

(71) Applicant: VESTAS WIND SYSTEMS A/S, Aarhus N. (DK)

(72) Inventors: Torsten Lund, Fredericia (DK); Germán Claudio Tarnowski, Aarhus N (DK); John Godsk Nielsen, Hornslet (DK); Per Hagen Nielsen, Tilst (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

(21) Appl. No.: 17/923,856

(22) PCT Filed: May 6, 2021

(86) PCT No.: PCT/DK2021/050144
§ 371 (c)(1),
(2) Date: Nov. 7, 2022

(87) PCT Pub. No.: WO2021/223829
PCT Pub. Date: Nov. 11, 2021

(65) Prior Publication Data
US 2023/0178988 A1 Jun. 8, 2023

(30) Foreign Application Priority Data
May 6, 2020 (DK) .................... PA 2020 70292

(51) Int. Cl.
*H02J 3/18* (2006.01)
*H02J 3/24* (2006.01)
*H02J 3/38* (2006.01)

(52) U.S. Cl.
CPC ............... *H02J 3/18* (2013.01); *H02J 3/24* (2013.01); *H02J 3/381* (2013.01); *H02J 2300/28* (2020.01)

(58) Field of Classification Search
CPC ...... H02J 3/18; H02J 3/24; H02J 3/381; H02J 2300/28; H02J 3/16; F05B 2270/1033; Y02E 40/30
See application file for complete search history.

(56) References Cited

U.S. PATENT DOCUMENTS 7,808,126 B2 * 10/2010 Stiesdal .................... H02J 3/38
307/57
8,049,352 B2 * 11/2011 Jorgensen ............... H02J 3/381
290/44
(Continued)

FOREIGN PATENT DOCUMENTS

EP      3322061 A1    5/2018
JP   2018196182 A   12/2018
(Continued)

OTHER PUBLICATIONS

Danish Patent and Trademark Office, 1st Technical Examination including The Search Report and Search Opinion for Application PA 2020 70292 dated Nov. 5, 2020.
(Continued)

*Primary Examiner* — Pedro J Cuevas
(74) *Attorney, Agent, or Firm* — Patterson + Sheridan, LLP (57) ABSTRACT

Aspects of the present invention relate to a method of voltage control for at least one wind turbine generator configured to absorb and supply reactive power on demand, the method comprises: receiving a dispatch signal from a power plant controller indicating a reactive power set point; determining a terminal voltage level of the at least one wind turbine generator; generating a reactive power correction
(Continued)

value based on a deviation of the terminal voltage level from a voltage set point; adjusting the reactive power set point by the reactive power correction value; and controlling the at least one wind turbine generator according to the adjusted reactive power set point.

19 Claims, 4 Drawing Sheets

(56) References Cited

U.S. PATENT DOCUMENTS

| | | | | |
|---|---|---|---|---|
| 9,371,821 | B2* | 6/2016 | Larsen | H02J 3/50 |
| 9,581,139 | B2* | 2/2017 | Fortmann | F03D 7/042 |
| 9,831,810 | B2* | 11/2017 | Achilles | H02J 3/1842 |
| 9,920,745 | B2* | 3/2018 | Fortmann | H02J 3/50 |
| 10,240,586 | B2* | 3/2019 | Egedal | H02J 3/50 |
| 10,599,175 | B1 | 3/2020 | Wells et al. | |
| 11,067,059 | B2* | 7/2021 | Brombach | F03D 7/0284 |
| 11,258,387 | B1* | 2/2022 | Wagoner | H02M 7/487 |
| 11,342,748 | B2* | 5/2022 | Datka | H02J 3/381 |
| 2009/0096211 | A1* | 4/2009 | Stiesdal | H02J 3/38 |
| | | | | 290/44 |
| 2010/0308585 | A1* | 12/2010 | Jorgensen | F03D 7/048 |
| | | | | 290/44 |
| 2012/0306277 | A1 | 12/2012 | Garcia | |
| 2014/0062085 | A1* | 3/2014 | Larsen | H02J 3/381 |
| | | | | 290/44 |
| 2014/0175887 | A1 | 6/2014 | Shao et al. | |
| 2015/0061289 | A1 | 3/2015 | Larsen et al. | |
| 2015/0088326 | A1* | 3/2015 | Fortmann | F03D 7/043 |
| | | | | 700/287 |
| 2015/0184640 | A1* | 7/2015 | Fortmann | F03D 9/257 |
| | | | | 290/44 |
| 2015/0303861 | A1 | 10/2015 | Panosyan et al. | |
| 2015/0337808 | A1 | 11/2015 | Kang et al. | |
| 2016/0268940 | A1* | 9/2016 | Achilles | H02P 9/00 |
| 2017/0234301 | A1* | 8/2017 | Egedal | H02J 3/50 |
| | | | | 700/287 |
| 2020/0116127 | A1* | 4/2020 | Brombach | H02J 3/46 |
| 2021/0288499 | A1* | 9/2021 | Martin | H02J 3/48 |
| 2022/0077683 | A1* | 3/2022 | Datka | H02J 3/381 |
| 2022/0077688 | A1* | 3/2022 | Patarroyo | H02J 3/46 |
| 2022/0399719 | A1* | 12/2022 | Ma | H02J 3/381 |
| 2023/0155384 | A1* | 5/2023 | Chinthavali | H02J 3/06 |
| | | | | 307/22 |
| 2023/0155389 | A1* | 5/2023 | Chinthavali | H02J 3/46 |
| | | | | 323/207 |
| 2023/0155390 | A1* | 5/2023 | Chinthavali | H02J 3/06 |
| | | | | 307/52 |
| 2023/0167802 | A1* | 6/2023 | Grosseholz | F03D 7/0284 |
| | | | | 290/44 |
| 2023/0291204 | A1* | 9/2023 | Yin | H02J 3/18 |

FOREIGN PATENT DOCUMENTS

| | | | |
|---|---|---|---|
| WO | 2010102662 A1 | 9/2010 | |
| WO | 2015078471 A1 | 6/2015 | |
| WO | 2021223829 A1 | 11/2021 | |
| WO | WO-2022056119 A1 * | 3/2022 | H02J 3/18 |

OTHER PUBLICATIONS

PCT, International Search Report for Application PCT/DK2021/050144 dated Aug. 7, 2021.

PCT, Written Opinion of The International Searching Authority for Application PCT/DK2021/050144 dated Aug. 7, 2021.

* cited by examiner

Upper plot: Dash-dot: $V_{Pcc-ref}$, Solid: $V_{unit-n}$, Dot: $V_{unit-n-setp}$ Lower plot: Solid: $Q_{unit-n\ control}$, Dot: $Q_{unit-n-setp}$

Figure 4

Upper plot: Dash-dot: $V_{Pcc-ref}$, Solid: $V_{unit-n}$, Dot: $V_{unit-n-setp}$ Lower plot: Solid: $Q_{unit-n\ control}$, Dot: $Q_{unit-n-setp}$

METHOD AND CONTROL SYSTEMS FOR VOLTAGE CONTROL IN RENEWABLE ENERGY POWER PLANT

TECHNICAL FIELD

The present disclosure relates to a method and control systems for voltage control in renewable energy power plants. Particularly, the disclosure relates to methods and control systems for voltage control in weak grid environments.

BACKGROUND

The interconnection between a renewable energy power plant and a power network may, under certain situations, be described as being a 'weak grid interconnection'. In other words, the power plant is connected to a power network that is considered to be a 'weak grid' at the point of interconnection. The presence of a weak grid means that small changes in reactive/active power exchange between the power plant and the network may result in large changes in voltage.

The weak grid introduces the risk for a renewable energy power plant to destabilise voltage levels. Therefore, it is desirable for renewable energy power plants to act to both restrict actions that produce destabilisation and to act to mitigate any destabilisation that occurs.

A completely decentralized voltage control strategy where the individual units or generators maintain local voltages, as is implemented in some conventional systems, introduces the risk of so-called 'hunting' between the individual units to achieve a stable voltage level. Such a setup is also sensitive to movement of the tap changer of the plant transformer.

A centralized control scheme, as may also be conventionally implemented, has the advantage of being able to control the voltage at the point of connection which is where grid requirements are typically stated. Limitations of this implementation is that the sampling rates, restrict the ability of the power plant to react to fast changes in weak grids. This has the potential to introduce destabilisation into the network. Subsequently, when destabilising, high-frequency oscillations are produced on the network, the sampling resolution of the controllers can be too coarse to identify and counteract the oscillations. This coarseness in sampling resolution also limits the ability of the power plant controllers to adequately respond to fast changes in the voltage levels of the power network other than oscillations, causing non-compliance with network regulations or grid codes.

It is an aim of the present invention to address one or more of the disadvantages associated with the prior art.

SUMMARY OF THE INVENTION

According to an aspect of the present invention there is provided a method of voltage control for at least one wind turbine generator configured to absorb and supply reactive power on demand. The method comprises the steps of: receiving a dispatch signal from a power plant controller indicating a reactive power set point; determining a terminal voltage level of the at least one wind turbine generator; generating a reactive power correction value based on a deviation of the terminal voltage level from a voltage set point; adjusting the reactive power set point by the reactive power correction value; and controlling the at least one wind turbine generator according to the adjusted reactive power set point.

Other devices may be configured to absorb and supply reactive power on demand may also comprise devices selected from: renewable energy generators and photovoltaic generators; battery energy storage systems.

Advantageously, the above method provides voltage control both locally at generator-level and at the point of connection between a power plant and the power network to which it is connected. This is particularly advantageous in weak grid environments where stability is important. By providing fast local voltage control, destabilising voltage jumps in response to large changes in set point can be prevented. Where voltage changes do occur, for example a voltage drop or oscillations in voltage level caused by the instability of the weak grid, these voltage changes can be mitigated by the fast local control. Thus, the method makes use of the faster sampling of local controllers, and offsets the slow reactions of power plant controllers with this fast sampling.

The deviation based on which reactive power correction value is generated may comprise high-frequency deviations of the terminal voltage level with respect to the voltage set point.

Low-frequency deviations are deviations that the slower sampling rate of power plant controllers are able to account for. Thus high-frequency deviations are those that power plant controllers are unable to account for because their sampling resolution is too low.

Optionally the method comprises determining the high-frequency deviations by filtering the terminal voltage level. Alternatively, the method may comprise determining the high-frequency deviations by filtering the deviations of the terminal voltage level from the voltage set point.

The filtering may remove low-frequency deviations of the terminal voltage level with respect to the voltage set point.

By filtering low frequency deviations and/or by basing the correction on high-frequency deviations, the method removes the possibility that the action of the power plant controller will be duplicated and acts on the deviations that the controller may not identify. Furthermore, basing the correction on high-frequency deviations improves the speed of reaction to high-frequency voltage deviations by isolating them. The method can also be configured to reduce voltage swings in the grid by reacting slowly to step changes in reactive power set points.

The method may comprise determining the voltage set point by applying a low-pass filter to the determined terminal voltage level.

Determining the voltage set point may comprise comparing the output of the filter with a voltage limit. If the output exceeds the limit, the voltage set point may be calculated as the limit.

Typical time constants of the low-pass filter may be in the range of 0.5 seconds to 60 seconds. For example, the time constant may be 10 seconds.

The low-pass filter may comprise an IIR filter or an FIR filter. The low-pas filter may comprise a moving average filter.

The voltage set point may be a pre-set voltage set point.

Generating the reactive power correction value may comprise determining the deviation between the voltage set point and the terminal voltage level. Generating the reactive power correction value may comprise applying a high-pass filter to the deviation, the reactive power correction value being based on the filtered deviation.

Typical time constants of the high-pass filter may be in the range of 0.5 seconds to 60 seconds. For example, the time constant may be 10 seconds.

The high-pass filter may comprise an FIR filter or an IIR filter.

The reactive power correction value may be generated based on an inverse droop factor.

The reactive power set point received from the PPC may be limited based on a reactive power limit. The limit may permit the set point to exceed the maximum allowable reactive power output from the device. The limit may be calculated to be equal to $\Delta V*K$, where K is the inverse droop factor or controller gain factor, and $\Delta V$ is the maximum possible change in voltage.

According to an aspect of the invention there is provided a controller for a device configured to absorb and supply reactive power on demand, the controller being configured to implement the method described above.

According to an aspect of the invention there is provided a system for controlling a renewable energy power plant having a plurality of devices configured to absorb and supply reactive power on demand. The system comprises: at least one controller implementing the method described above. The system comprises a power plant controller. The power plant controller is configured to: determine, based on a measured voltage and measured reactive power at a point of interconnection between the renewable energy power plant and a power network, at least one reactive power set point; and dispatch the at least one reactive power set point to the at least one controller.

The renewable energy power plant may comprise a hybrid power plant having at least two sub-plants comprising different types of renewable energy generators.

The system may comprise at least one controller for each sub-plant. The power-plant controller may be configured to determine and dispatch at least one reactive power set point for each sub-plant.

According to another aspect of the invention, there is provided a computer program product downloaded from a communication network and/or stored on a machine readable medium, comprising program code instructions for implementing a method described above.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Generally, the invention described herein provides a method and a controller for implementing the method that enables fast voltage control both at a point of interconnection between a power network and power plant and locally to the power plant. The method involves the steps of receiving a reactive power set point from a power plant controller, determining a deviation or error value between a local voltage level and a voltage set point, and correcting the reactive power set point based on an adjustment value generated using the deviation. Accordingly, in circumstances where instability of the power network is an important consideration, such as weak grid interconnections, the fast sampling rate of local controllers can be harnessed for voltage control to avoid introducing oscillations on the network and to counteract sudden changes in voltage.

The relatively slow actions of power plant controllers in response to power network events is therefore adequately compensated for at a local level, without having to change the operation of the power plant controller.

Figure 1:
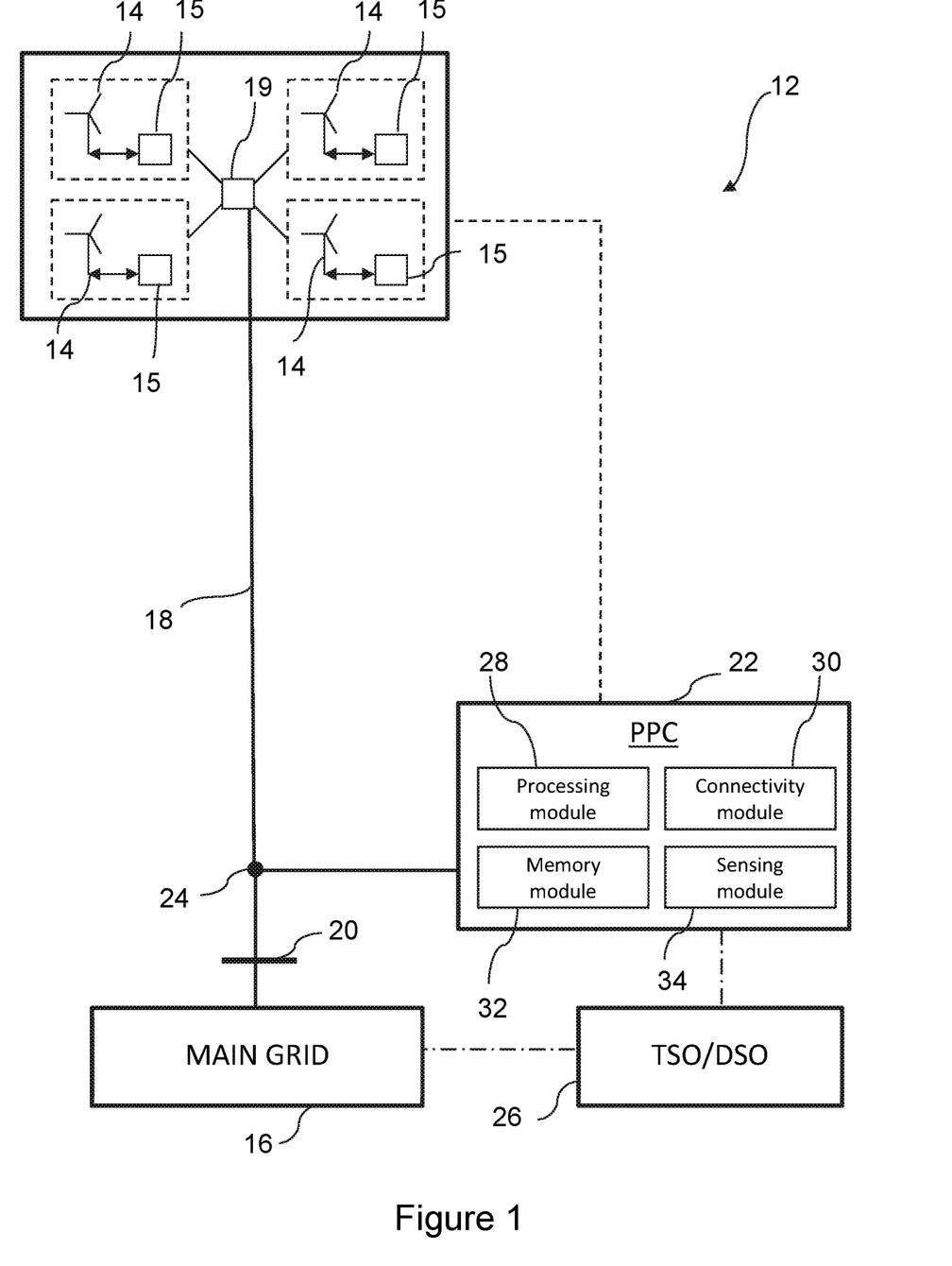
FIG. 1 shows a schematic representation of a power network.

FIG. 1 illustrates a typical architecture in which a wind power plant (WPP), which may also be referred to as a wind park or wind farm, is connected to a main grid as part of a wider power network. As will be understood by the skilled reader, a WPP comprises at least one wind turbine generator (WTG), and is also known as a wind park or a wind farm. A WTG is commonly referred to as a wind turbine. The examples shown are representative only and the skilled reader will appreciate that other specific architectures are possible, in relation to both wind power plants, power plants for other renewable energy sources such as solar power plants, wind turbine generators and other renewable energy generating sources, and hybrid power plants having a combination of different types of renewable energy power plants. Thus, the invention also relates to renewable energy power plants and renewable energy generators in general, rather than being specific to wind power plants and generators as in the Figures. The components of the wind power plant and power network are conventional and as such would be familiar to the skilled reader. It is expected that other known components may be incorporated in addition to or as alternatives to the components shown and described in FIG. 1. Such changes would be within the capabilities of the skilled person.

FIG. 1 shows a power network 19 incorporating a WPP 12 and a power plant controller 22 (PPC). The WPP 12 includes a plurality of WTGs 14. Each of the plurality of WTGs 14 converts wind energy into electrical energy, which is transferred from the WPP 12 to a main transmission network or main grid 16, as active power and/or current, for distribution. Individual generators may each be referred to in this description as a 'unit'.

Although not illustrated in this Figure, the WPP 12 may also include compensation equipment, such as a static synchronous compensator (STATCOM) or another type of synchronous compensator, configured to provide reactive power or reactive current support as required. The WPP 12 may also include a battery energy storage system.

Each of the WTGs 14 is associated with a respective WTG controller 15. In some examples, a set of WTGs may share a single, semi-centralised WTG controller, such that there are fewer WTG controllers than WTGs. As would be understood by the skilled person, WTG controllers 15 can be considered to be computer systems capable of operating a WTG 14 in the manner prescribed herein, and may comprise multiple modules that control individual components of the WTG or just a single controller. The computer system of the WTG controller 15 may operate according to software downloaded via a communications network or programmed onto it from a computer-readable storage medium.

During normal operation of the WPP 12, the WTG controllers 15 operate to implement active and reactive current and/or power requests received from the PPC 22 to provide frequency and voltage support to the main grid 16. During extraordinary conditions, the WTG controllers 15 operate to fulfil predetermined network requirements, and also act to protect the WTGs 14 from any potentially harmful conditions.

The WPP 12 is connected to the main grid 16 (also called the main power network) by a connecting network 18. The WPP 12 and the main grid 16 are connected at a Point of Interconnection (PoI) 20, which is an interface between the WPP 12 and the main grid 16. The PoI 20 may also be referred to as the Point of Common Connection, which may be abbreviated to 'PCC' or 'PoCC'.

The WTGs 14 are connected to one another locally by local grid 19, (also called the local power network or park grid). The function of the local grid is to channel power from each of the WTGs 14 to the connecting network 18 to the main grid 16.

The Power Plant Controller (PPC) 22 is connected to the main grid 16 at a Point of Measurement (PoM) 24 and is connected to the WTG controllers 15. The role of the PPC 22 is to act as a command and control interface between the WPP 12 and the grid 16, and more specifically, between the WPP 12 and a grid operator, such as a transmission system operator (TSO) or a distribution system operator (DSO) 26. The PPC 22 is a suitable computer system for carrying out the controls and commands as described above and so incorporates a processing module 28, a connectivity module 30, a memory module 32 and a sensing module 34. The PPC 22 may also receive information regarding the grid 16 and/or the local buses, substations and networks from an energy management system (not shown). The WPP 12 is capable of altering its power or current output in reaction to commands received from the PPC 22.

As part of its operation, the PPC 22 generates and sends dispatch signals to the WTG controllers 15. The WTG controllers 15 control the WTGs according to set points contained within the dispatch signals.

During normal operation, the PPC 22 operates in one of a number of modes. One such mode is a voltage control mode, in which the PPC 22 issues dispatch signals configured to cause the WTGs 14 to supply or absorb reactive power to support the voltage level of the power network. In particular, the PPC 22 supplies signals to the WTGs 14 for maintaining voltage levels within a voltage dead-band of between, approximately 0.9 per unit (p.u.) voltage and 1.1 p.u. voltage, as measured at the PoI 20 or PoM 24.

As would be understood by the skilled person, per-unit voltage is an expression of the voltage with respect to a base value which is used as a reference. Using a per-unit system allows for normalization of values across transformers and other components that may change the value by an order of magnitude.

The PPC 22 may issue a variety of different dispatch signals and set points to the WTG controllers 15 for implementation. In the present embodiments, the PPC 22 is configured to issue dispatch signals to the WTG controllers 15 that indicate reactive power set points for the WTGs 14 to meet.

Figure 2:
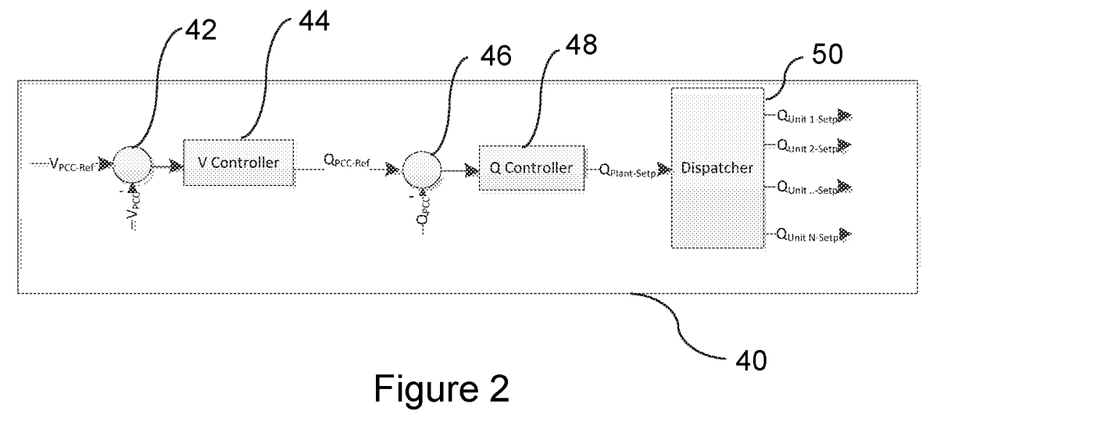
FIG. 2 shows a block diagram of a voltage controller for a power plant controller.

FIG. 2 illustrates a PPC voltage control unit 40 that forms part of the processing module 28 of the PPC 22. The control unit 40 is configured to generate the dispatch signals for communicating reactive power set points to the WTG controllers 15.

For generating the dispatch signals, the control unit 40 receives a voltage reference level, labelled '$V_{PCC\text{-}Ref}$' in FIG. 2, as an input. The voltage reference level is a voltage level to be achieved at the PoI 20. The voltage reference level may be a pre-set reference, a calculated reference based upon other measurements, or may be a reference received from the TSO or other control operator. Generally, the voltage reference level is around 1 p.u. voltage, and within a voltage dead-band of between 0.9 p.u. and 1.1 p.u.

The control unit 40 also receives a measured voltage level, measured at the PoM 24, labelled '$V_{PCC}$' in FIG. 2.

An error value is calculated as the difference between the voltage reference level and the measured voltage level is determined at the subtractor junction 42, by subtracting the measured voltage level from the voltage reference level. This error value is input to a voltage controller 44. The voltage controller 44 calculates a reactive power reference level, '$Q_{PCC\text{-}Ref}$', based on the error value. The voltage controller 44 typically comprises a proportional-integral (PI) controller or a proportional-integral-derivative (PID) controller, and may also include limiters to prevent the reactive power reference level from exceeding certain limits.

The reactive power reference level, like the voltage reference level, is a reactive power level that is to be achieved at the PoI 20. Thus, the reactive power reference level is a level to which the output of the WPP 12 is adjusted.

To ensure that the reactive power reference level is met at the PoI 20, the PPC 22 generates a whole-plant set point for the WPP 12 to meet, '$Q_{Plant\text{-}Setp}$'. The plant set point is a set point for the WPP 12 for changing the measured reactive power level at the PoI, '$Q_{PCC}$', to become the reference level $Q_{PCC\text{-}Ref}$.

To generate the plant set-point, the error value between the reference level and the measured reactive power level is calculated at subtractor junction 46 and used as input to a reactive power controller 48. The reactive power controller 48 may comprise a PI or PID controller, along with other control blocks for generating the plant set point.

Having generated a plant set point, a dispatcher 50 distributes the plant set point between the individual WTGs 14 of the WPP 12. The distribution may be performed in a number of ways, such as according to a predetermined split, or based on an optimisation algorithm taking into account the availability of reactive power support from each WTG 14. The output of the dispatcher 50 is a plurality of set points, '$Q_{Unit\text{-}N\text{-}Setp}$', with one set point being provided for each device that absorbs or supplies reactive power in the plant, which in this case are the WTGs 14. The PPC 22 issues these set points as dispatch signals to the individual WTG controllers 15 for controlling the WTGs 14 accordingly.

The WPP 12 and the PoI 20 are connected through the connecting network 18 which can comprise cables, overhead lines and transformers. The connecting network 18 introduces impedance that causes losses between the WPP 12 and the PoI 20, particularly with regard to reactive power. Thus, the set points determined for either the WPP 12 as a whole by the reactive power controller or for the individual WTGs 14 may be determined to account for the losses in reactive power caused by the connecting network 18.

In some cases, a weak grid interconnection may exist. Weak grid interconnections occur most often in remotely located facilities where insufficient infrastructure is provided. Weak grid interconnections cause volatility and instability in the main grid, meaning that small exchanges in reactive or active power at the PoI 20 may result in large fluctuations of grid voltage, and that grid voltage is liable to change quickly. Where weak grid interconnections exist, stability of voltage is particularly important.

In the context of the PPC 22 issuing set points for WTGs 14, a weak grid interconnection may result in instability if the set points change too rapidly. Changing reactive power quickly may cause oscillations in grid voltage. Moreover, the PPC 22 operates at a low sampling frequency, and issues set points at a relatively slow rate, such that it may not be able to take into account fast changes in grid voltage or oscillations that occur. In comparison, a WTG controller 15 has a much faster sampling frequency and can issue control signals to WTGs 14 at faster rates. A WTG controller may sample at a sampling frequency one or even two orders of magnitude higher. For example, a PPC may sample at a sampling rate approximately 25 Hz, while a WTG controller may sample at a frequency of 1000 Hz or higher.

In order to account for the weak grid and to provide stability during voltage control, the WTG controllers 15 incorporate a WTG voltage control unit. In general, the WTG voltage control unit operates to receive the dispatch signal received from the PPC 22, to adjust the set-point based on a deviation of a terminal voltage from a voltage set point, and to control the WTG 14 accordingly. In doing so, and because of the faster sampling and reaction of the WTG controllers, local voltage control can be implemented that preserves stability and counteracts instability.

Figure 3:
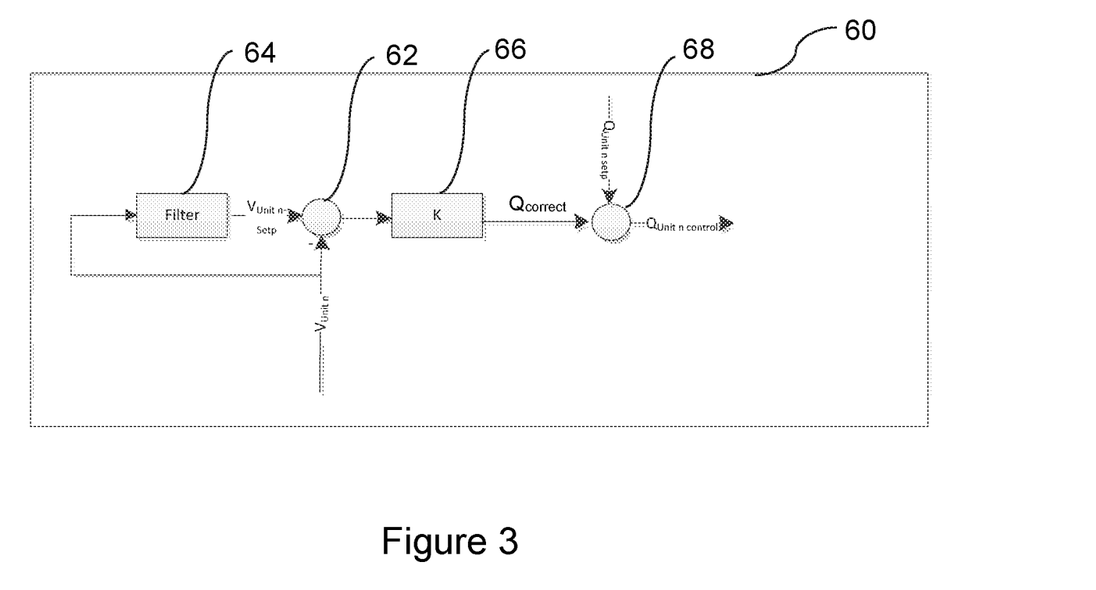
FIG. 3 shows a block diagram of a voltage controller for a generator controller according to an embodiment of the invention.

An embodiment of an implementation of a WTG voltage control unit is shown in FIG. 3. The WTG voltage control unit 60 receives two inputs: a measured terminal voltage of the WTG 14, labelled '$V_{unit\ n}$'; and the reactive power set point from the PPC 22.

Based on the measured terminal voltage, a voltage set point, '$V_{Unit\ n\text{-}Setp}$', is generated. At the subtractor junction 62, an error value between the voltage set point and the measured terminal voltage is determined as the deviation between the set point and the measured terminal voltage.

In the embodiment of FIG. 3, the voltage set point is generated by passing the measured terminal voltage through a low-pass filter 64. The low-pass filter 64 removes high-frequency content from the measured terminal voltage. The low-pass filter 64 operates using a moving-average to effectively smooth out sharp changes in the voltage level. High-frequency content smoothed by the low-pass filter 64 may, for example, comprise voltage oscillations, spikes, and dips, and voltage step changes.

The low-pass filter may comprise an IIR filter or an FIR filter. The low-pass filter may operate using a moving average or moving window filter. The time constant of the low-pass filter may be greater than 0.5 seconds and less than 60 seconds, although in some embodiments the time constant may be outside of these values to achieve the correct cut-off frequency. It will be appreciated that the longer the time constant, the more low-frequency events the filter includes in its output, therefore changing the effect of the voltage control unit 60.

Therefore, the combination of error calculation at the subtractor junction 62 and set-point being generated as a low-pass filtered terminal voltage level results in an output signal based on the high-frequency content of the measured terminal voltage. The low-frequency content forming the set-point is removed, and a value indicating high-frequency deviations in terminal voltage is generated.

This high-frequency error value is multiplied by the factor K, the gain factor of the controller, which may also be called the inverse droop factor of the controller, at block 66 to attain a reactive power correction value, '$Q_{correct}$'. The correction value is used as an input at the next subtractor junction 68, where the reactive power set point is adjusted based on the correction value by subtraction. The output of the junction 68 is a reactive power level, '$Q_{Unit\ n\ control}$', according to which the WTG controller 15 controls the WTG 14.

Figure 4:
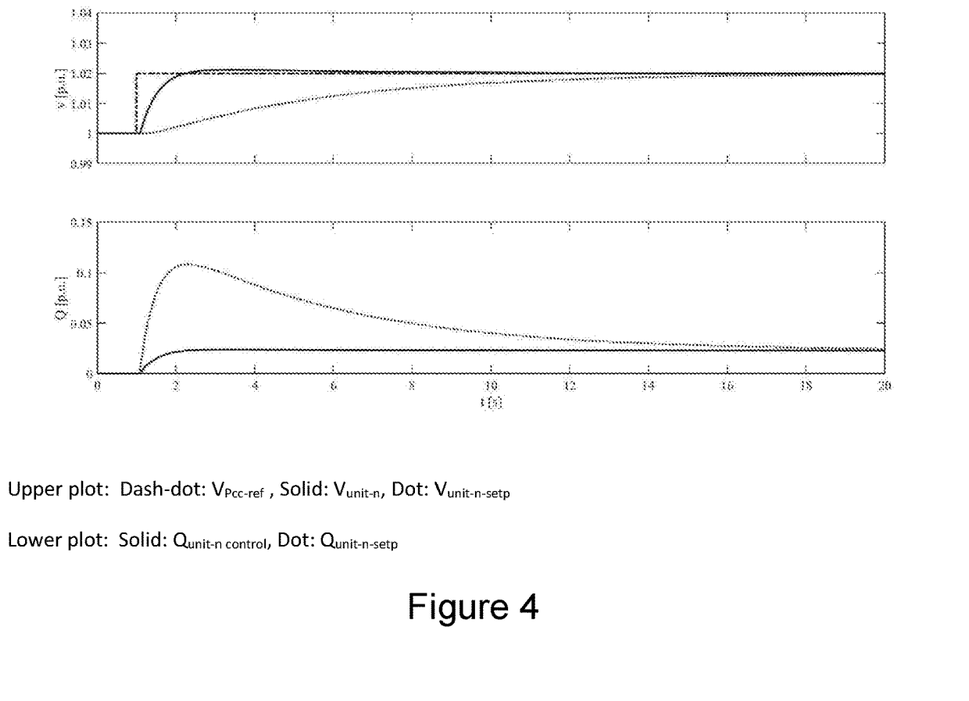
FIG. 4 shows a chart showing reaction of the voltage controllers of FIGS. 2 and 3 to a reactive power reference change.
Figure 5:
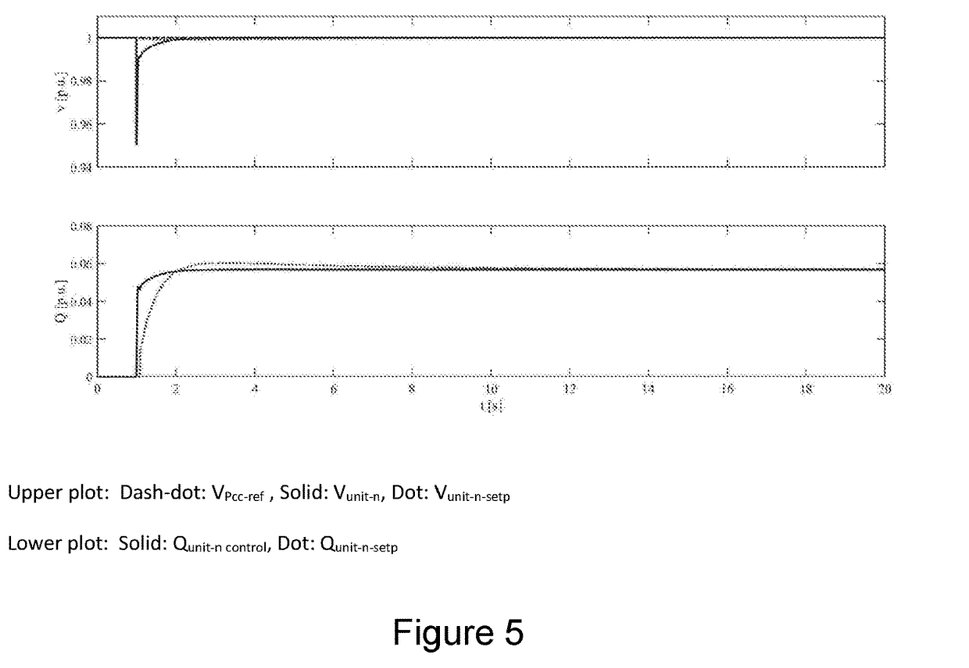
FIG. 5 shows a chart showing reaction of the voltage controllers of FIGS. 2 and 3 to a voltage drop.

FIGS. 4 and 5 illustrate examples of how the WTGs react to changes in voltage reference for the PPC and to a voltage drop respectively. In each of FIGS. 4 and 5, the upper chart illustrates voltages, including: PPC voltage reference level, $V_{PCC\text{-}Ref}$; a WTG internal voltage reference level, $V_{unit\ n\text{-}setp}$; and measured terminal voltage level of the WTG, $V_{unit\ n}$. As shown below the graph, these are represented by a dash-dot line, a solid line, and a dotted line respectively. The lower charts show reactive power values including: reactive power set point issued to a WTG by the PPC, $Q_{unit\ n\text{-}setp}$ and measured reactive power at the WTG, $Q_{Unit\ n\text{-}control}$. $Q_{unit\ n\text{-}setp}$ is represented by a dotted line, and $Q_{unit\ n\text{-}control}$ is represented by a solid line.

Turning initially to FIG. 4, at 1 second the voltage reference, $V_{PCC\text{-}Ref}$, which is input to the PPC 22 changes from 1.00 p.u. to 1.02 p.u. voltage.

In response, as shown in FIG. 2, the PPC 22 determines a difference between the voltage reference and the measured grid voltage level. Based on the change in voltage reference, the PPC 22 calculates the error signal and generates set-points for dispatching to the WTG controllers 14—the line $Q_{unit\ n\text{-}setp}$ in the lower chart indicating this.

However, as can be seen, the output in reactive power from the WTG 14 differs from the reactive power set point issued by the PPC 22 due to the action of the WTG voltage control unit 60.

Instead, based on the terminal voltage of the WTGs 14, which at 1 second is lower than the voltage reference of the PPC 22, a voltage set point is generated as a low-pass filtered version of the terminal voltage, and compared with the terminal voltage to generate a correction value for the reactive power set point.

As can be seen in the lower chart, the PPC 22 sends a reactive power set point which is temporarily higher than the required reactive power of the grid. This temporarily high set point is generated in response to error signals calculated within the PPC 22. The WTG voltage control unit 60 counteracts the action of the PPC 22 based on the action of the low-pass filter, comparison, and K-factor, and the WTG is controlled to provide a lower reactive power than is expected by the PPC 22. The K-factor is the gain of the voltage controller, which may also be referred to as an inverse droop factor. The PPC 22 therefore requests higher reactive power until the voltage level error is reduced.

The amount of over-compensation by the PPC 22 and the counteraction by the WTG voltage control unit 60 is related to the size of the change in reference and to the K-factor of the voltage control unit 60. The size of the change in reference is 2%, which therefore causes an error signal from the subtractor junction 62 of 2% immediately after the change. As the K-factor for this example is 5, the difference in reactive power set point level is 10% between 1 and approximately 2 seconds as the WTG voltage control unit 60 calculates $Q_{correct}$ to provide a 10% reduction in the set point provided by the PPC 22.

It follows, therefore, that in some circumstances, the reactive power set point from the PPC 22 may exceed the maximum value for the reactive power set point that can be achieved by the WTG 14. The interface between the PPC 22 and the WTG 14 must therefore allow for exchange of set points which are higher than the capability of the WTG 14. Accordingly, limits applied to the reactive power set point prior to it being received by the WTG voltage control unit 60 may be altered to permit this exceedance. In a particular In other words, the method according to which the voltage control unit 60 operates may include adjustment of a limit or application of a new limit for the reactive power set point received from the PPC that permits the set points that are greater than the maximum reactive power set point of the WTG.

Such a limit may be based on the action and response of the WTG voltage control unit. Rather than being purely based on the maximum allowable reactive power set point, the limit may be generated and applied based on the maximum change in voltage reference level and the K-factor of the turbine. In other embodiments, other values may be used to generate a limit. In an embodiment, the limit is generated to allow an extra reactive power of the value $\Delta V*K$, where $\Delta V$ is the largest voltage set point step that is possible (i.e. without voltage ride-through protection being implemented), and K is the K-factor/gain of the controller as already explained. So, for example, where a 10% voltage change is possible, for a controller having a K-factor of 5, the limit to the reactive power set point should be adjusted to allow the PPC to request 50% more reactive power than the WTG is limited to.

In other examples, limits may instead or additionally be placed on the output value from the junction 68.

Turning to FIG. 5, at 1 second the Thévenin voltage of the grid is stepped from 1 p.u. to 0.95 p.u. at 1 second. Hence, the measured voltage level of the grid drops from approximately 1 p.u. to 0.95 p.u., as can be seen in the upper chart. The voltage reference of the PPC 22 remains at 1.0 p.u. As the grid voltage drops, so does the terminal voltages of the WTGs 14 and the grid reference level.

As shown in the lower chart, the response in the output of reactive power support from the WTGs 14 is almost immediate—the drop of approximately 5% in the grid voltage is mostly compensated for by the fast reaction of the WTG voltage control unit 60 supplying close to a 5% increase in reactive power. The voltage set-point generated within the voltage control unit 60 is a low-pass filtered version of the measured terminal voltage.

Thus, based on a moving average, the sharp, high-frequency voltage drop is filtered out of the set-point initially, and the voltage set-point generated within the voltage control unit 60 remains relatively high, being much closer to the voltage levels before the drop. Thus, the correction value for the reactive power set-point is a correction to return a higher voltage level.

As the reactive power set point from the PPC 22 increases, the reactive power level of the WTG 14 is also increased further, until it reaches a steady level and the voltage level is returned to 1 p.u.

Thus, the WTGs 14 are operated to quickly respond to voltage drops to return voltage levels to near-normal values as quickly as possible. It will be appreciated that the voltage drop described was a drop within the voltage deadband. The embodiments described herein are for use in situations in which the voltage levels are within the deadband, in order to avoid under-voltage ride-through (UVRT) and over-voltage ride through (OVRT) protocols. During UVRT and OVRT, the WTGs and PPC operate in UVRT- and OVRT-specific modes.

In general, the voltage control unit generates a correction value for adjusting a reactive power set point by removing low-frequency content from a measured terminal voltage signal with respect to a set point. In the embodiment of FIG. 3, this is performed by applying a low-pass filter as described above. In another embodiment, such as the voltage control unit 80 that is shown in FIG. 6, the filtering is performed after determining a deviation of the measured terminal voltage from a voltage set point.

Figure 6:
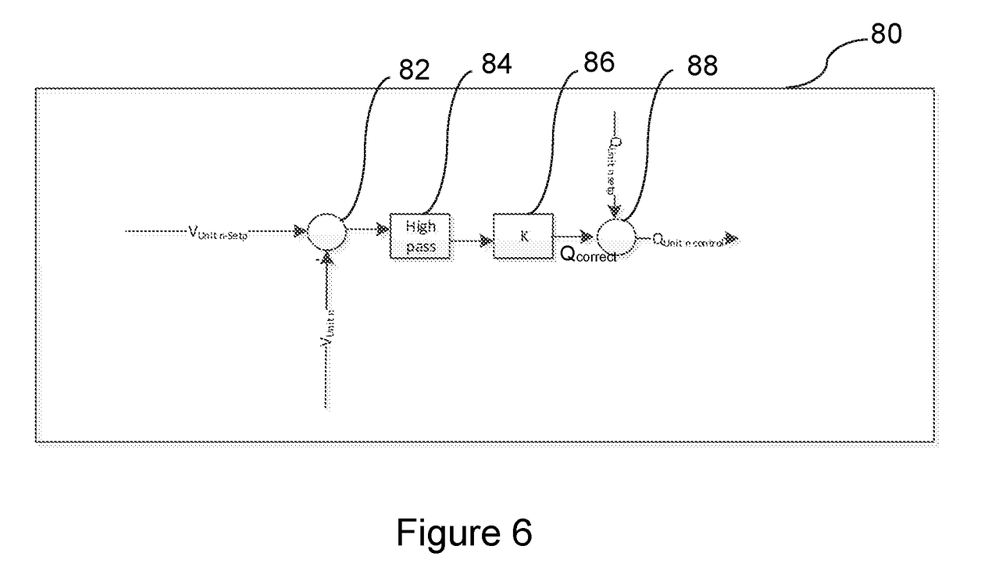
FIG. 6 shows a block diagram of a voltage controller for a generator controller according to another embodiment of the invention.

As can be seen in FIG. 6, a voltage set point and a measured terminal voltage are provided as inputs to a subtracting junction 82, in a similar way to the embodiment of FIG. 3. In FIG. 6, however, the voltage set point is calculated in a different way. The voltage set point may, for example, be a pre-set set point, or may be received by the control unit from another controller.

The error signal output from the subtracting junction 82 is passed through a high-pass filter 84. The high-pass filter removes low-frequency content from the error signal, again allowing for the generation of a correction value by applying the K-factor at block 86 and subtracting the correction value from the input reactive power set point received from the PPC 22 at subtracting junction 88. This achieves the effect of removing low-frequency content and correcting the set point to react to changes in voltage level and to preserve stability of the main grid.

The high-pass filter may be an IIR filter or an FIR filter. The time constants for the high-pass filter may also be selected in the range of 0.5 seconds to 60 seconds, although in some embodiments the time constant may be outside these values.

Figure 7:
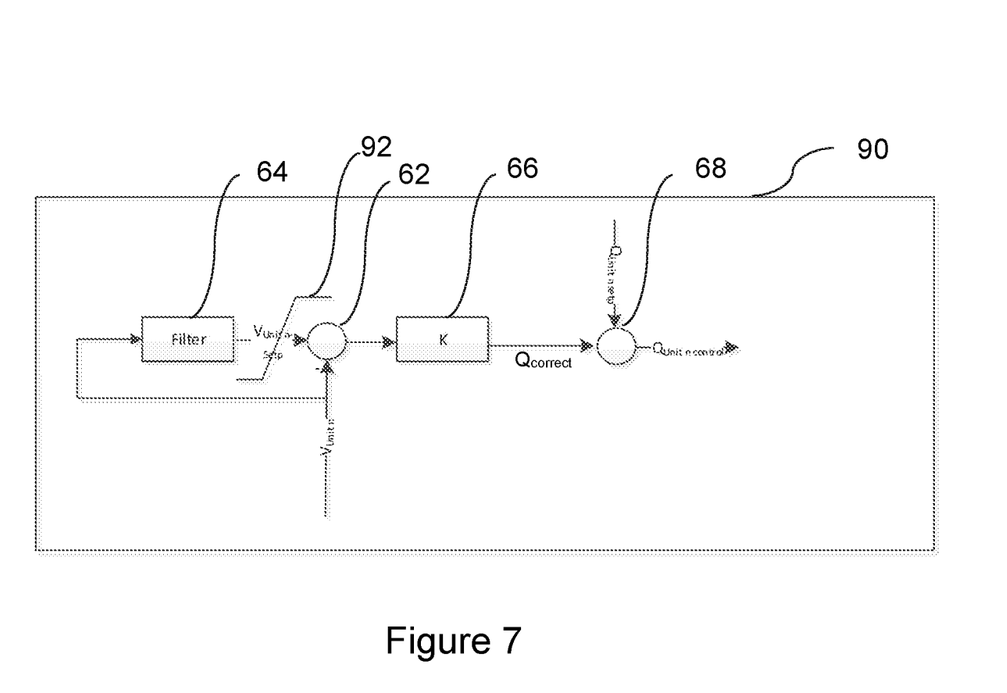
FIG. 7 shows a block diagram of a voltage controller for a generator controller according to another embodiment of the invention.

A further embodiment of a voltage control unit 90 is shown in FIG. 7. The voltage control unit 90 shares many of the same features of the voltage control unit 60 of FIG. 3, and so these will not be described again. For clarity these similar features have been labelled with the same reference numerals. The difference in the unit 90 of FIG. 7 is the inclusion of a limiter 92 between the low-pass filter 64 and the subtracting junction 62. The limiter 92 limits the voltage set-point to ensure that the voltage set-point generated does not exceed one or more voltage limits. In some embodiments, the limits are implemented as the voltage dead-band, i.e. between approximately 0.9 p.u. and 1.1 p.u. In other embodiments, the voltage limits may be determined dynamically, depending upon the measured voltage level.

In some embodiments, the control unit may be shared by several generators rather than being for individual generators.

Each of these embodiments operates according to the general method of voltage control whereby a reactive power set point is received from the PPC as part of a dispatch signal, a terminal voltage is measured, a deviation of the terminal voltage from a set-point is determined, a correction value is generated based on the deviation, and the generator is controlled accordingly.

While the above embodiments have all been described in relation to a wind power plant and wind turbine generators, the control method and unit may be applied in any device within a renewable energy power plant configured to absorb and supply reactive power. Such devices include, for example, renewable energy generators including wind turbine generators and photovoltaic generators; battery energy storage systems; STATCOMs; and synchronous condensers.

Moreover, the renewable energy power plant may comprise a hybrid power plant having two or more sub-plants, each having a different type of renewable energy generator. In this situation, the voltage control units may be assigned to each sub-plant or individually. Using these units and methods in a hybrid power plant enables dynamic utilization of the different types of generating units and their reactive power output properties. For example, different generators may have different response times and may be limited in terms of reactive power ramp rate, so the control units may be configured to harness these different properties. The methods described herein prevent what is known as 'hunting' between different units of a hybrid power plant, where the units try to control one voltage level separately, and without regard for their own local voltage levels.

It will be appreciated that various changes and modifications can be made to the present invention without departing from the scope of the present application.

The invention claimed is:

1. A method of voltage control for at least one wind turbine generator configured to absorb and supply reactive power on demand, the method comprising:
    receiving a dispatch signal from a power plant controller indicating a reactive power set point;
    determining a terminal voltage level of the at least one wind turbine generator;
    generating a reactive power correction value based on a deviation of the terminal voltage level from a voltage set point;
    adjusting the reactive power set point by the reactive power correction value; and
    controlling the at least one wind turbine generator according to the adjusted reactive power set point.

2. The method of claim 1, wherein the deviation based on which reactive power correction value is generated comprises high-frequency deviations of the terminal voltage level with respect to the voltage set point.

3. The method of claim 2 wherein the high-frequency deviations are determined by filtering the terminal voltage level or deviations of the terminal voltage level from the voltage set point.

4. The method of claim 3, wherein the filtering removes low-frequency deviations of the terminal voltage level with respect to the voltage set point.

5. The method of claim 1, comprising determining the voltage set point by applying a low-pass filter to the determined terminal voltage level.

6. The method of claim 5, wherein determining the voltage set point comprises comparing the output of the filter with a voltage limit, and if the output exceeds the limit, calculating the voltage set point as the limit.

7. The method of claim 5, wherein the filter has a time constant in the range of 0.5 seconds to 60 seconds.

8. The method of claim 5, wherein the filter comprises an FIR filter or an IIR filter.

9. The method of claim 1, wherein the voltage set point is a pre-set voltage set point.

10. The method of claim 9, wherein generating the reactive power correction value further comprises determining the deviation between the voltage set point and the terminal voltage level, and applying a high-pass filter to the deviation, the reactive power correction value being based on the filtered deviation.

11. The method of claim 1, wherein the reactive power correction value is generated based on an inverse droop factor.

12. A system for controlling a renewable energy power plant having at least one wind turbine generator configured to absorb and supply reactive power on demand, the system comprising:
    at least one controller, comprising:
        an input/output (I/O) interface; and
        one or more processors communicatively coupled to the I/O interface; and
    a power plant controller configured to:
        determine, based on a measured voltage and measured reactive power at a point of interconnection between the renewable energy power plant and a power network, at least one reactive power set point; and
        dispatch the at least one reactive power set point to the at least one controller.

13. The system of claim 12, wherein the at least one wind turbine generator comprises at least one renewable energy generator, and wherein the renewable energy power plant comprises a hybrid power plant having at least two sub-plants comprising different types of renewable energy generators, the system comprising at least one controller for each sub-plant, and wherein the power plant controller is configured to determine and dispatch at least one reactive power set point for each sub-plant.

14. A computer program product comprising code stored on a machine readable medium, wherein the code, when executed by one or more processors, performs an operation of voltage control for at least one wind turbine generator configured to absorb and supply reactive power on demand, the operation comprising:
    receiving a dispatch signal from a power plant controller indicating a reactive power set point;
    determining a terminal voltage level of the at least one wind turbine generator;
    generating a reactive power correction value based on a deviation of the terminal voltage level from a voltage set point;
    adjusting the reactive power set point by the reactive power correction value; and
    controlling the at least one wind turbine generator according to the adjusted reactive power set point.

15. The program product of claim 14, wherein the deviation based on which reactive power correction value is generated comprises high-frequency deviations of the terminal voltage level with respect to the voltage set point.

16. The program product of claim 15, wherein the high-frequency deviations are determined by filtering the terminal voltage level or deviations of the terminal voltage level from the voltage set point.

17. A controller, comprising:
    an input/output (I/O) interface; and
    one or more processors communicatively coupled to the I/O interface, wherein the one or more processors are programmed to perform an operation of voltage control for at least one wind turbine generator configured to absorb and supply reactive power on demand, the operation comprising:

receiving a dispatch signal from a power plant controller indicating a reactive power set point;

determining a terminal voltage level of the at least one wind turbine generator;

generating a reactive power correction value based on a deviation of the terminal voltage level from a voltage set point;

adjusting the reactive power set point by the reactive power correction value; and controlling the at least one wind turbine generator according to the adjusted reactive power set point.

18. The controller of claim 17, wherein the deviation based on which reactive power correction value is generated comprises high-frequency deviations of the terminal voltage level with respect to the voltage set point.

19. The controller of claim 18, wherein the high-frequency deviations are determined by filtering the terminal voltage level or deviations of the terminal voltage level from the voltage set point.

\* \* \* \* \*